(12) United States Patent
Malone et al.

(10) Patent No.: US 12,514,244 B2
(45) Date of Patent: Jan. 6, 2026

(54) CONVERTIBLE SEAT ASSEMBLY

(71) Applicant: Summit Treestands, LLC, Birmingham, AL (US)

(72) Inventors: Brian Malone, Birmingham, AL (US); Jacob Alan Nelson, Birmingham, AL (US)

(73) Assignee: Summit Treestands, LLC, Birmingham, AL (US)

( * ) Notice: Subject to any disclaimer, the term of this patent is extended or adjusted under 35 U.S.C. 154(b) by 1006 days.

(21) Appl. No.: 17/564,341

(22) Filed: Dec. 29, 2021

(65) Prior Publication Data

US 2023/0200374 A1 Jun. 29, 2023

(51) Int. Cl.
*A01M 31/02* (2006.01)

(52) U.S. Cl.
CPC .................. *A01M 31/02* (2013.01)

(58) Field of Classification Search
CPC .............................. A01M 31/02; A01M 31/00
See application file for complete search history.

(56) References Cited

U.S. PATENT DOCUMENTS

| | | | | |
|---|---|---|---|---|
| 4,782,918 A * | 11/1988 | Brunner | ................ | A01M 31/02 182/187 |
| 5,975,242 A | 11/1999 | Woller et al. | | |
| 7,971,685 B2 | 7/2011 | Simone | | |
| 8,833,518 B2 * | 9/2014 | Holcombe | ............ | A01M 31/02 297/440.1 |
| 9,516,874 B2 * | 12/2016 | Richey | .................. | A01M 31/02 |
| 9,986,732 B1 * | 6/2018 | Pope | ...................... | A01M 31/02 |
| 10,080,362 B1 * | 9/2018 | Alexander | ............ | A01M 31/02 |
| 10,582,704 B2 * | 3/2020 | Wheelington | ........ | A01M 31/02 |
| 10,798,937 B2 | 10/2020 | Berry | | |
| 10,912,293 B1 | 2/2021 | Miller | | |
| 11,229,200 B1 * | 1/2022 | Gardner | ................. | A01M 31/02 |
| 2003/0192741 A1 * | 10/2003 | Berkbuegler | ......... | A01M 31/02 182/187 |
| 2007/0261919 A1 * | 11/2007 | Roe | ........................ | A01M 31/02 182/187 |
| 2014/0008149 A1 * | 1/2014 | Fogel | ..................... | A01M 31/02 182/129 |
| 2019/0269245 A1 * | 9/2019 | Pope | ....................... | A47C 7/004 |

\* cited by examiner

*Primary Examiner* — David E Martinez
(74) *Attorney, Agent, or Firm* — Bradley Arant Boult Cummings LLP; Stephen H. Hall; Jessica L. Zurlo

(57) ABSTRACT

Convertible seats that can convert a seat from a standard seating position to an elevated seating position are provided. The convertible seat includes a primary seating surface integrally formed with a secondary seating surface, where the convertible seat can move between a standard seating configuration in which the primary seating surface is generally parallel with the ground and the secondary seating surface is generally perpendicular to the primary seating surface and an elevated seating configuration in which the secondary seating surface is generally parallel with the ground and the primary seating surface is generally perpendicular to the secondary seating surface. The elevated seating configuration can support a user in a sitting or leaning position that is higher than a sitting position in the standard seating configuration.

11 Claims, 14 Drawing Sheets

CONVERTIBLE SEAT ASSEMBLY

TECHNICAL FIELD

The present invention relates generally to a convertible seat that can convert the seat from a standard seating position to an elevated seating position. The convertible seat may be used for a variety of different seating applications, including, for example, seating for tree stands, boats, stadiums, theaters, and waiting areas.

BACKGROUND

Many different types of hunting tree stands and deer stands have been developed for hunting game. These tree stands typically include a standing platform and a seat so that a hunter may stand or sit while hunting. Hunters and other avid naturalists using the tree stands often desire an adjustable seat that can convert from a seated position into a standing position, or at least close to a standing position, in order to get a better view of the wildlife or to get better positioned to take a shot. Similarly, in the boating industry, boat seats that are normally built into the boats are typically located well down in the boat. The seat is generally too low to be conveniently used during many types of boating and fishing activities. Like hunters and naturalists, boaters generally desire boat seats that can be adjusted to convenient heights for activities, such as fishing, while permitting it to be safely occupied during movement of the boat. Although some adjustable seats exist for tree stands and boats, the adjustable seats are bulky, require multiple different seating components, and are difficult to adjust. Accordingly, there remains a need in the art for an improved adjustable seat that is more compact, can be operated more easily, and can be used for multiple different seating applications.

SUMMARY

The problems expounded above, as well as others, are addressed by the following inventions, although it is to be understood that not every embodiment of the inventions described herein will address each of the problems described above.

In some embodiments, a tree stand is provided, the tree stand including a standing surface; a support structure having an upper end and a lower end, wherein the lower end is operatively connected to the standing surface, a convertible seat operatively attached to the upper end of the support structure, wherein the convertible seat includes a primary seating surface integrally formed with a secondary seating surface, the primary seating surface extending from a rear edge to a frontmost edge of the convertible seat and the secondary seating surface extending from the frontmost edge to a bottom edge of the convertible seat, wherein the secondary seating surface curves downwardly from the frontmost portion to the bottom edge of the convertible seat, wherein the convertible seat is operable to move about a horizontal axis between a standard seating configuration in which the primary seating surface is generally parallel with the standing surface and the secondary seating surface is generally perpendicular to the primary seating surface and an elevated seating configuration in which the secondary seating surface is generally parallel with the standing surface and the primary seating surface is generally perpendicular to the secondary seating surface, and wherein the standard seating configuration supports a user in a first position at a first height and the elevated seating configuration supports the user in a second position at a second height, the second height being higher than the first height.

In one embodiment, the support structure includes a pair of legs and the convertible seat is pivotally attached to the upper ends of each of the legs via a pair of fittings. In other embodiments, the fittings each include a notch configured for engaging a locking mechanism on the support structure for securing the convertible seat in the elevated seating configuration. In still other embodiments, the locking mechanism includes a pair of stop members on each of the legs configured for engaging the notches on the fittings when the convertible seat is in the elevated seating configuration. In yet other embodiments, the primary seating surface is substantially flat. In still other embodiments, the second height is at least about 10 inches higher than the first height. In further embodiments, the convertible seat includes a seat frame having a rear edge, wherein the rear edge is operatively attached to the upper end of the support structure. In still further embodiments, when the convertible seat is oriented in the standard seating configuration, the convertible seat is operable to pivot in an upward direction about the horizontal axis to convert the convertible seat to the elevated seating configuration. In yet further embodiments, when the convertible seat is oriented in the elevated seating configuration, the convertible seat is operable to pivot in a downward direction about the horizontal axis to convert the convertible seat to the standard seating configuration.

In other embodiments, a tree stand is provided, the tree stand including upper and lower climbing platform members, each having a front end portion for engaging a tree to be climbed, a convertible seat pivotally attached to the upper climbing platform member, wherein the convertible seat comprises a primary seating surface integrally formed with a secondary seating surface, the primary seating surface extending from a rear edge to a frontmost edge of the convertible seat and the secondary seating surface extending from the frontmost edge to a bottom edge of the convertible seat, wherein the convertible seat is operable to pivot about a horizontal axis between a standard seating configuration in which the primary seating surface is generally parallel with the standing surface and the secondary seating surface is generally perpendicular to the primary seating surface and an elevated seating configuration in which the secondary seating surface is generally parallel with the standing surface and the primary seating surface is generally perpendicular to the secondary seating surface, and wherein the standard seating configuration supports a user in a first position at a first height and the elevated seating configuration supports the user in a second position at a second height, the second height being higher than the first height.

In some embodiments, the upper climbing member includes a vertical post and the convertible seat is pivotally attached to each side of the vertical post via a pair of fittings. In other embodiments, the fittings are pivotally attached to the vertical post by fasteners secured with a retaining member. In still other embodiments, the fittings each include a notch configured for engaging a locking mechanism on the vertical post for securing the convertible seat in the elevated seating configuration. In yet other embodiments, the locking mechanism includes a pair of stop members on each side of the vertical post configured for engaging the notches on the fittings when the convertible seat is in the elevated seating configuration. In further embodiments, the fittings each include a slot for receiving an edge of the convertible seat. In still further embodiments, the secondary seating surface curves downwardly from the frontmost portion to the bottom edge of the convertible seat. In yet further embodiments, the second height is at least about 10 inches higher than the first height. In other embodiments, the upper and lower climbing platform members each include an adjustable cable attached thereto for encircling the tree to be climbed. In still further embodiments, when the convertible seat is oriented in the standard seating configuration, the convertible seat is operable to pivot in an upward direction about the horizontal axis to convert the convertible seat to the elevated seating configuration. In other embodiments, when the convertible seat is oriented in the elevated seating configuration, the convertible seat is operable to pivot in a downward direction about the horizontal axis to convert the convertible seat to the standard seating configuration.

BRIEF DESCRIPTION OF THE DRAWINGS

Further features and advantages can be ascertained from the following detailed description that is provided in connection with the drawings described below.

DETAILED DESCRIPTION

Figure 1:
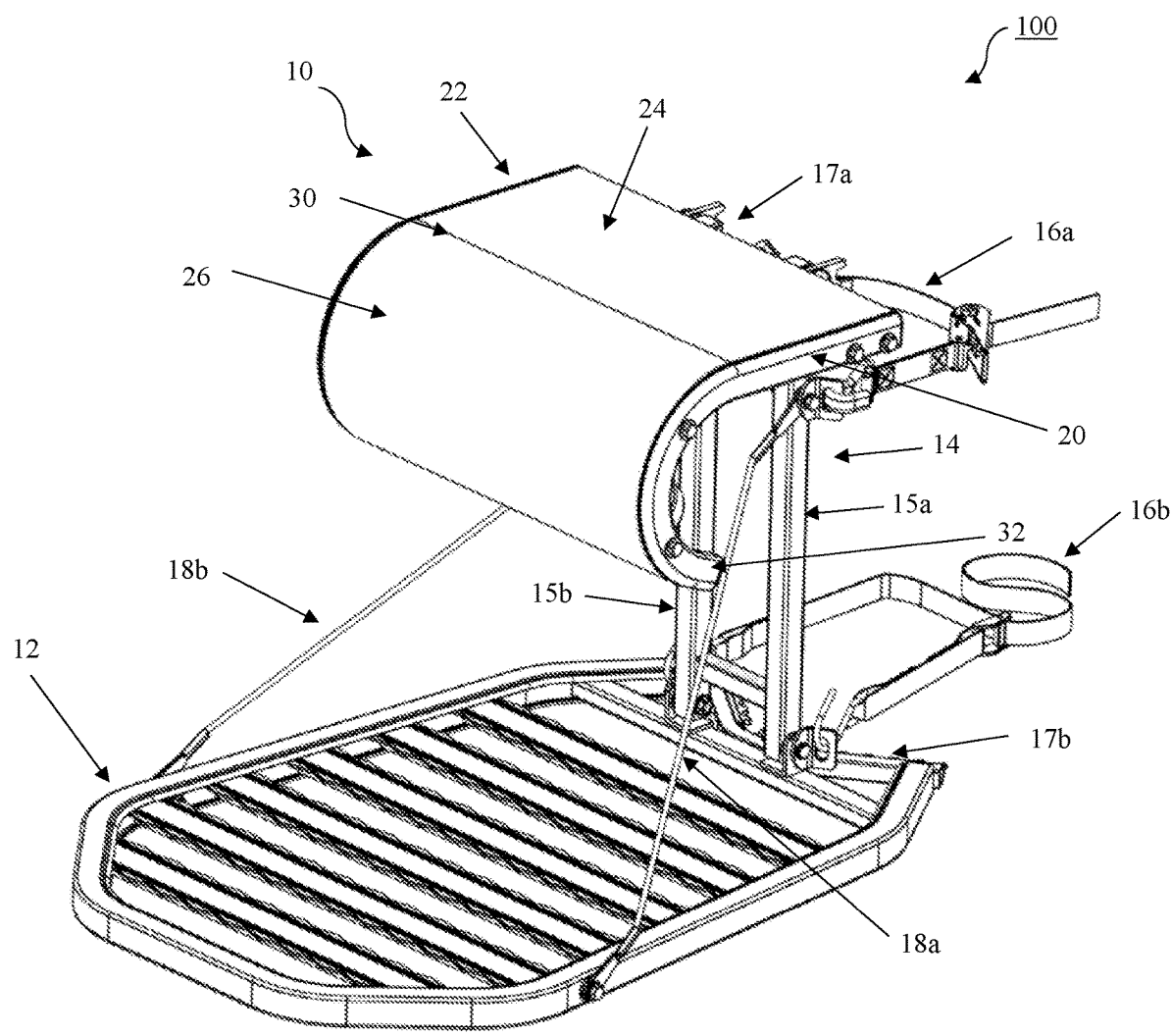
FIG. 1 is a perspective view of a hang-on tree stand having a convertible seat attached thereto in a horizontal or standard seating configuration according to one embodiment of the present disclosure.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Numerical quantities given in this description are approximate unless stated otherwise, meaning that the term "about" or "approximately" can be inferred when not expressly stated.

The terminology used herein is for the purpose of describing particular embodiments only and is not intended to be limiting. As used herein, the singular forms "a", "an" and "the" are intended to include the plural (i.e., "at least one") forms as well, unless the context clearly indicates otherwise.

The terms "first," "second," "third," and the like are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure.

Spatially relative terms, such as "above," "under," "below," "lower," "over," "upper," and the like, may be used herein for ease of description to describe one element or feature's relationship to another when the apparatus is right side up as shown in the accompanying drawings.

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

The present disclosure provides a convertible seat that can be utilized for a variety of different seating applications, including seating for hunting stands, boats, stadiums, construction vehicles, agricultural vehicles, and the like. The seat of the present disclosure is convertible between a standard seating configuration and an elevated seating/leaning configuration. The convertible seat permits quick and simple conversion between the two positions, giving the user comfort and support whether the user is sitting or leaning. The integral nature of the convertible seat also allows for a more compact design and dispenses of the need for separate seating structures for different seating configurations.

Figure 2:
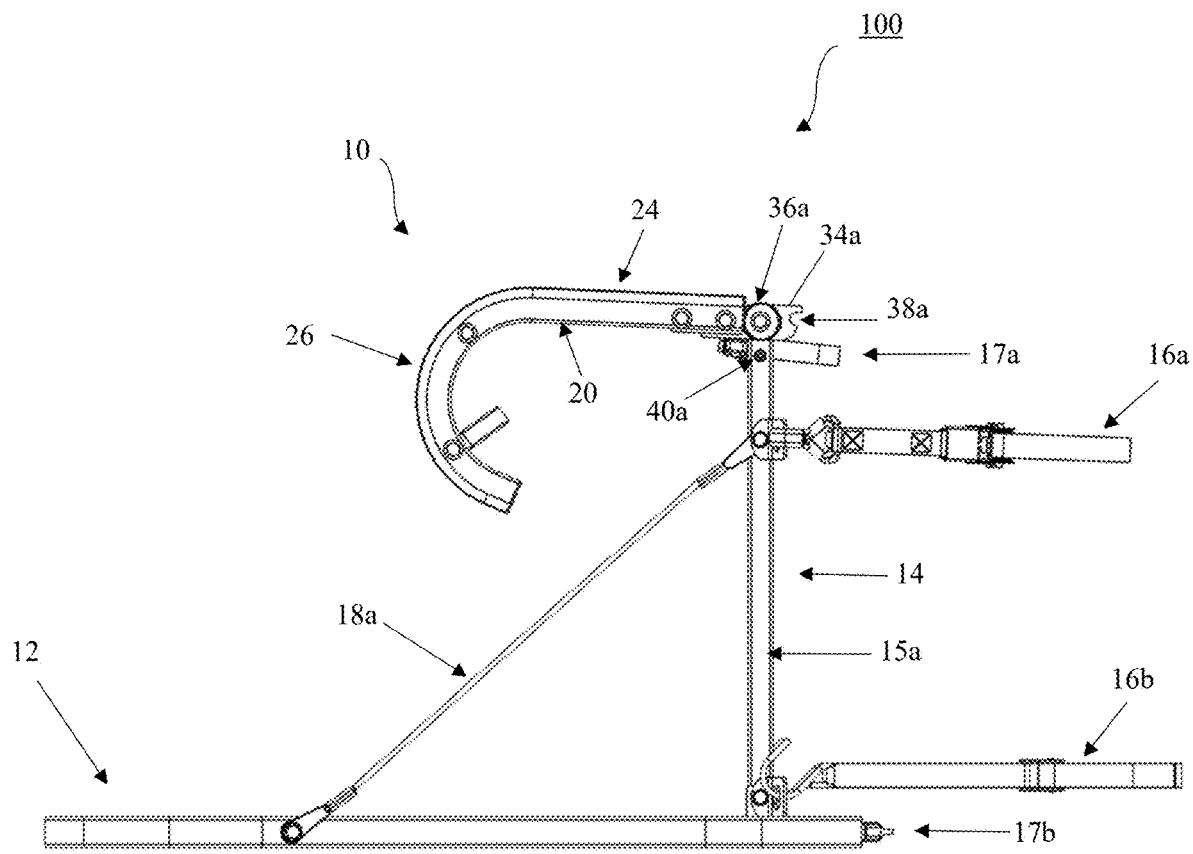
FIG. 2 is side view of the hang-on tree stand shown in FIG. 1.
Figure 3:
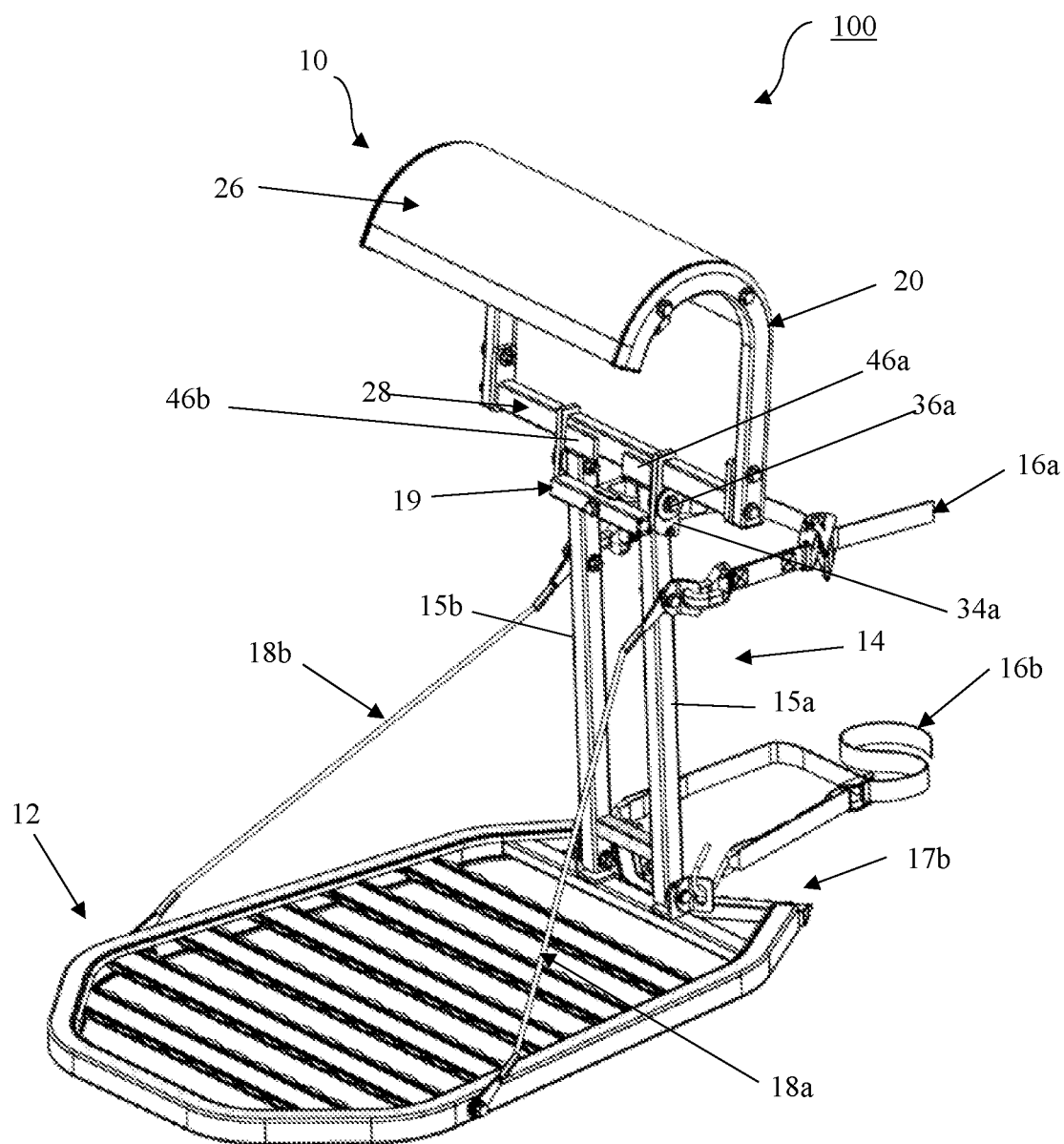
FIG. 3 is a perspective view of the hang-on tree stand having the convertible seat attached thereto in a vertical or elevated seating configuration according to one embodiment of the present disclosure.
Figure 4:
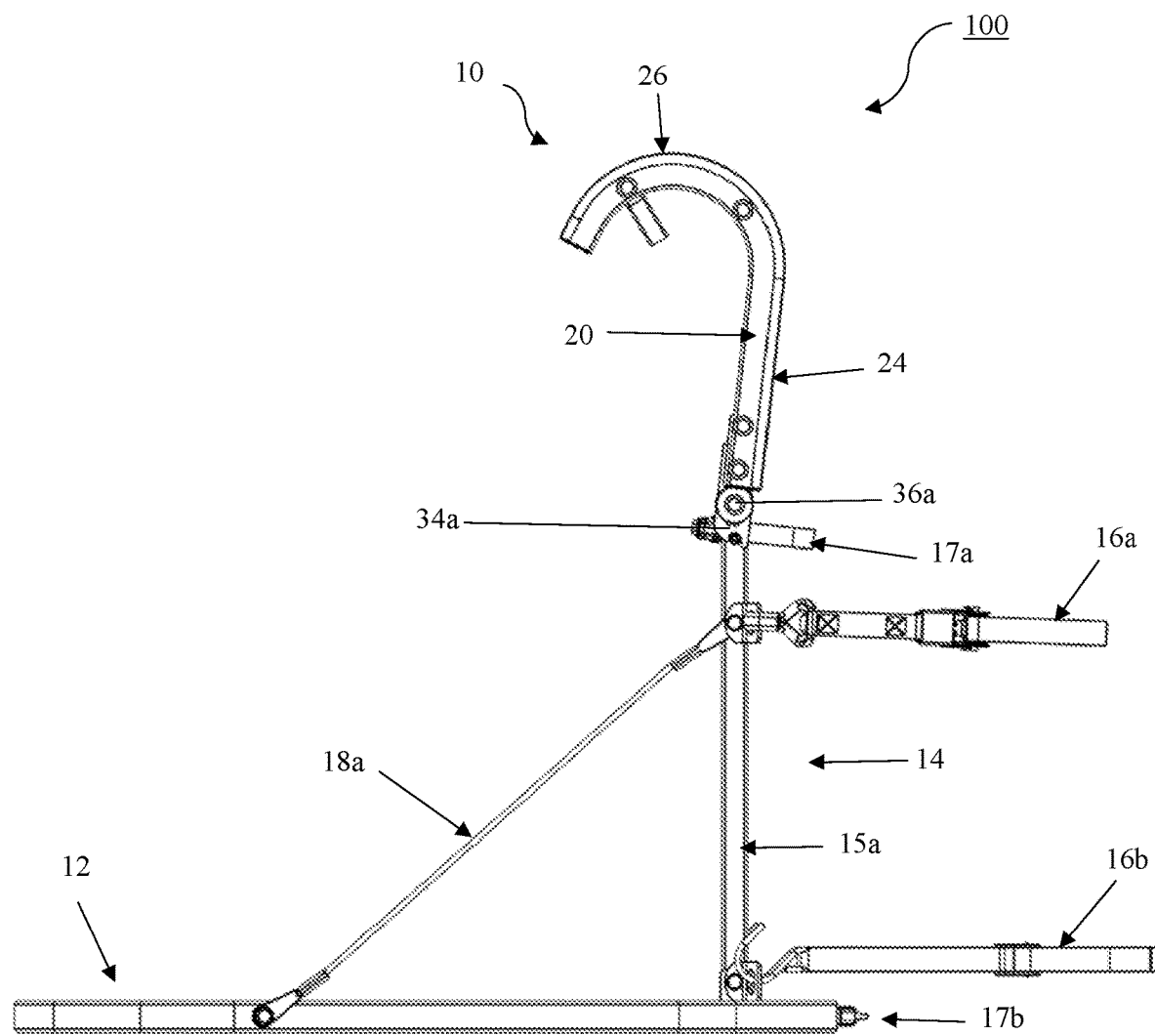
FIG. 4 is a side view of the hang-on tree stand shown in FIG. 3.

Referring to FIGS. 1-4, a hang-on tree stand 100 that includes a convertible seat 10 according to an exemplary embodiment of the present disclosure is shown. The hang-on tree stand 100 may be affixed or secured to a tree in an open, operational position, as shown in FIGS. 1-4, for hunting game. The convertible seat 10 provides a dual seat arrangement for the hang-on tree stand 100 where the seat 10 can be converted between a horizontal or standard seating configuration, as illustrated in FIGS. 1 and 2, and a vertical or elevated seating configuration, as illustrated in FIGS. 3 and 4. The horizontal configuration allows a user to sit in a normal sitting position, for instance, a 90-degree sitting posture. The vertical configuration provides an elevated seating or leaning position for the user. The elevated seating or leaning position may be particularly advantageous for hunters when a hunter sees a deer or other game in the distance and wishes to get a better view of the game. The elevated seating or leaning position may also be advantageous for photographers or naturalists viewing wildlife and other aspects of nature.

The hang-on tree stand 100 includes a standing platform 12 and a support structure 14 having two legs 15a, 15b pivotally engaged with the standing platform 12. A convertible seat 10 is operatively attached to upper ends of each of the legs 15a, 15b of the support structure 14. The hang-on tree stand 100 may be affixed or secured to a tree using adjustable straps 16a, 16b that are operatively attached to the support structure 14. A pair of flexible support cables 18a, 18b may be attached between the support structure 14 and the standing platform 12 to maintain the support structure 14 and the standing platform 12 at a generally right angle during use. A pair of upper and lower blades 17a, 17b may also be attached to the support structure 14. The upper and lower blades 17a, 17b dig into the tree or engage the tree while the adjustable straps 16a, 16b encircle and hold the tree stand 100 against the tree. Horizontal brace 19 extending across the legs 15a, 15b of the support structure 14 may be used to attach the upper blades 17a to the support structure 14.

The convertible seat 10 includes a seat frame 20 having a seating surface 22 attached thereto. The seating surface 22 has a primary seating surface 24 integrally formed with a secondary seating surface 26. The primary seating surface 24 extends from a rear edge 28 of the seat frame 20 to a front edge 30 of the seat 10. As shown in FIG. 1, the primary seating surface 24 is substantially flat, such that the user may comfortably sit anywhere along the primary seating surface 24. The secondary seating surface 26 extends from the front edge 30 of the seat 10 to a bottom edge 32 of the seat frame 20. As illustrated in FIG. 1, the secondary seating surface 26 gradually curves downward from the front edge 30 to the bottom edge 32 to avoid the pressure of a hard edge on the thighs of the user when sitting in the standard seating configuration.

FIGS. 1 and 2 show the convertible seat 10 oriented in a horizontal or standard seating configuration, which allows the user to sit in a normal sitting position. As shown in FIGS. 1 and 2, when the convertible seat 10 is in the horizontal or standard seating configuration, the primary seating surface 24 is generally parallel with the standing platform 12 while the secondary seating surface 26 is oriented in a generally downward perpendicular orientation with respect to the primary seating surface 24. The horizontal or standard seating configuration provides a first sitting position for the user at a first height. In this embodiment, the user is generally seated in a 90-degree posture with the user's feet on the surface of the standing platform 12.

FIGS. 3 and 4 show the convertible seat 10 oriented in a vertical or elevated seating configuration, which allows the user to sit at an elevated position or lean against the seat 10. As shown in FIGS. 3 and 4, when the convertible seat 10 is in the vertical or elevated seating configuration, the secondary seating surface 26 is generally parallel with the standing platform 12 while the primary seating surface 24 is oriented in a generally downward perpendicular orientation with respect to the secondary seating surface 26. The vertical or elevated seating configuration provides a second sitting position for the user at a second height. In this embodiment, the second sitting position is at a height higher than the first sitting position provided by the horizontal or standard seating configuration. In some embodiments, the second sitting position provided in the vertical configuration is at least about 8 inches higher than the first sitting position provided in the horizontal configuration. In other embodiments, the second sitting position provided in the vertical configuration is at least about 10 inches higher than the first sitting position provided in the horizontal configuration. In still other embodiments, the second sitting position provided in the vertical configuration is at least about 12 inches higher than the first sitting position provided in the horizontal configuration. In yet other embodiments, the second sitting position provided in the vertical configuration is at least about 18 inches higher than the first sitting position provided in the horizontal configuration. For instance, the second sitting position provided in the vertical configuration may be about 10 inches to about 18 inches higher than the first sitting position provided in the horizontal configuration.

Figure 5A:
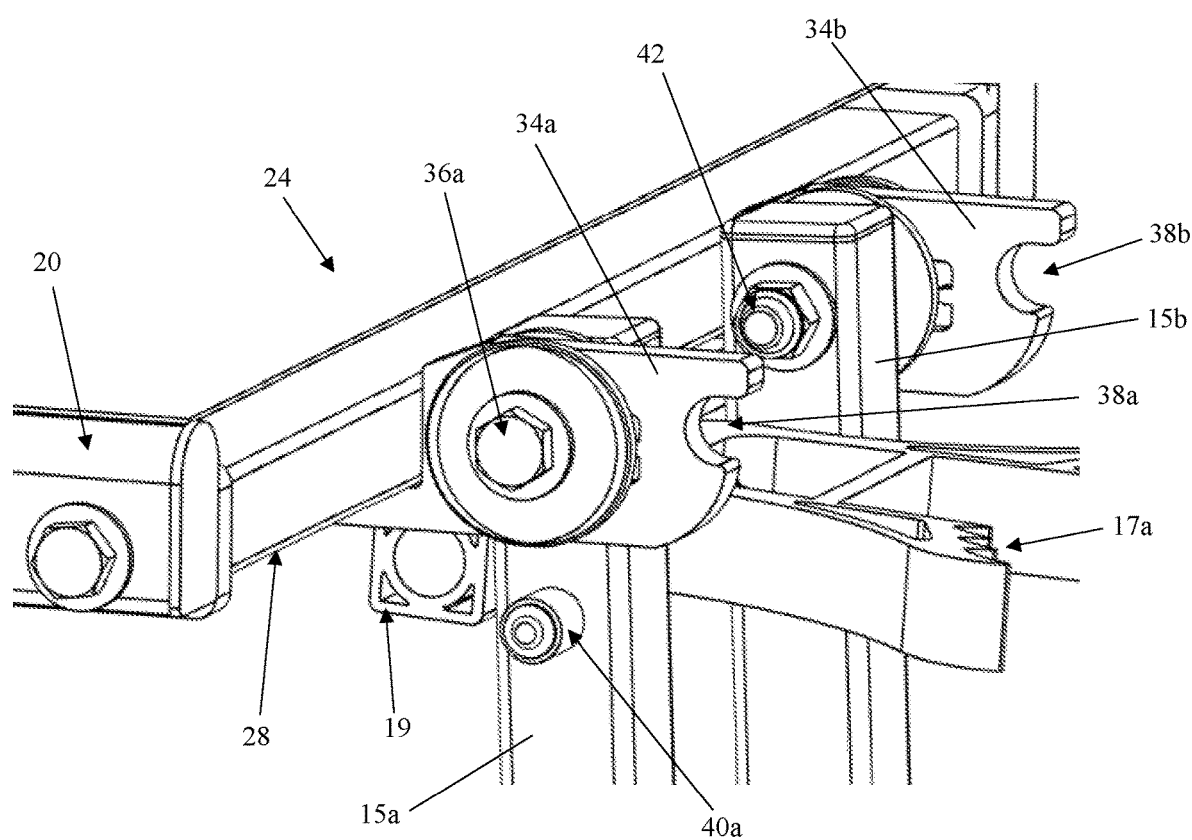
FIG. 5A is an enlarged view of a pivoting and locking mechanism for the convertible seat when positioned in the horizontal or standard seating configuration according to an exemplary embodiment of the present disclosure.
Figure 5B:
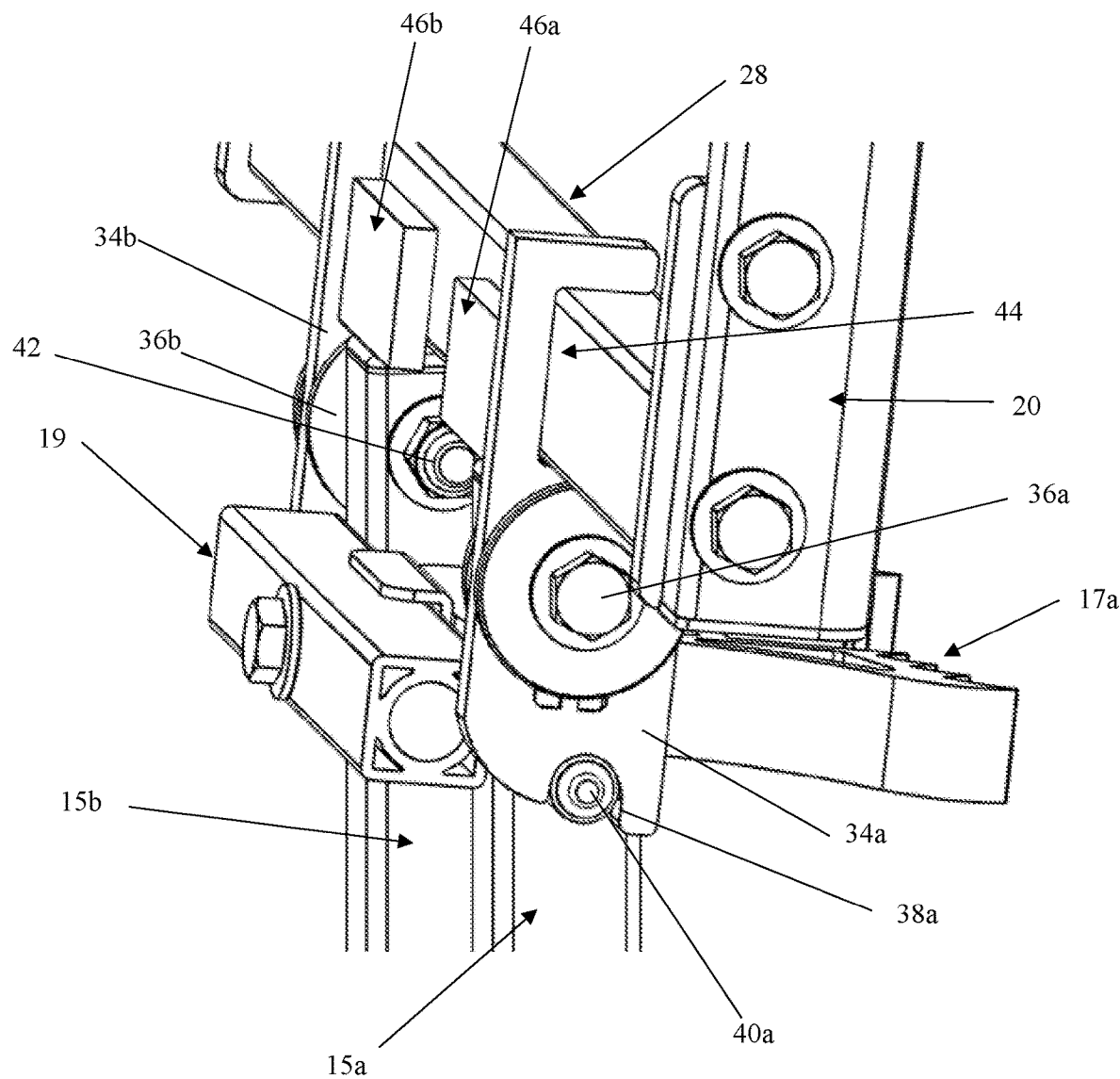
FIG. 5B is an enlarged view of the pivoting and locking mechanism for the convertible seat when positioned in the vertical or elevated seating configuration according to an exemplary embodiment of the present disclosure.

The convertible seat 10, including the seat frame 20 with the seating surface 22 attached thereto, can pivot about a generally horizontal axis to move the convertible seat 10 between the standard seating configuration and the elevated seating configuration described above. As best shown in FIG. 3, an underside of the rear edge 28 of the seat frame 20 is attached to each of the legs 15a, 15b of the support structure 14 via fittings 34a, 34b. The fittings 34a, 34b each include a slot 44 that is sized and shaped to receive a portion of the rear edge 28 of the seat frame 20. The fittings 34a, 34b are attached to each leg 15a, 15b of the support structure 14 via fasteners 36a, 36b received through corresponding holes in the fittings 34a, 34b and the support structure 14. The fasteners 36a, 36b may be secured in place with a retaining member 42, as illustrated in FIGS. 5A and 5B. For example, the fasteners 36a, 36b may be through-hole bolts secured in place with retaining members, such as nuts comprising an inner thread for threaded engagement with the bolts. The fittings 34a, 34b and the fasteners 36a, 36b attached thereto provide a pivot connection between the seat frame 20 and the support structure 14. That is, the seat frame 20 can pivot about the horizontal axis of the fasteners 36a, 36b in an upward and downward direction to change the configuration of the convertible seat 10.

FIGS. 5A and 5B show the fittings 34a, 34b that permit pivotal movement about the horizontal axis and a locking mechanism for securing the convertible seat 10 in the vertical configuration when the seat 10 is flipped upwardly. As shown in FIGS. 5A and 5B, the fittings 34a, 34b include notches 38a, 38b adjacent to the fasteners 36a, 36b. The notches 38a, 38b are configured to engage with stop members 40a, 40b positioned below the fasteners 36a, 36b on the legs 15a, 15b of the support structure 14 as the convertible seat 10 pivots in an upward direction. When the convertible seat 10 is oriented in the horizontal configuration, as shown in FIG. 5A, the fittings 34a, 34b and corresponding notches 38a, 38b are aligned horizontally with the seat frame 20. As the convertible seat 10 pivots in an upward direction, the fittings 34a, 34b and corresponding notches 38a, 38b move in a clockwise direction toward the stop members 40a, 40b. The notches 38a, 38b are configured to engage with the stop members 40a, 40b as the convertible seat 10 pivots upward to the vertical or elevated seating configuration. The stop members 40a, 40b lock the fittings 34a, 34b in place and prevent any further pivot movement in the upward direction, as illustrated in FIG. 5B. When the user wishes to move the convertible seat 10 to the horizontal configuration, the user may pull the seat 10 in an upward direction, the force of which releases the fittings 34a, 34b from the stop members 40a, 40b so that the seat 10 can pivot downward to the horizontal configuration.

The stop members 40a, 40b described above are configured to lock the convertible seat 10 in place while the seat 10 is oriented in the vertical configuration. However, the seat 10 may also include a locking mechanism to secure the convertible seat 10 in place while the seat 10 is oriented in the horizontal configuration. As illustrated in FIGS. 3 and 5B, the rear edge 28 of the seat frame 20 includes two brace members 46a, 46b positioned directly above each of the legs 15a, 15b of the support structure 14 and adjacent to the fittings 34a, 34b. The brace members 46a, 46b abut the legs 15a, 15b of the support structure 14 to prevent any further pivot movement in the downward direction once the convertible seat 10 is oriented in the horizontal configuration. That is, the brace members 46a, 46b act as a physical stop in preventing any further movement in the downward direction when the user is seated in the horizontal or standard seating configuration. In the illustrated embodiment, the brace members 46a, 46b are rectangular shaped to match the rectangular contour of the seat frame 20. However, the brace members 46a, 46b may have any other suitable shape so long as the brace members 46a, 46b are capable of abutting the support structure 14 to prevent further pivoting in the downward direction.

The stop members on the support structure and the brace members positioned on the seat been illustrated herein as exemplary locking mechanisms. As will be apparent to those of ordinary skill in the art, various other securing or locking mechanisms may be used with the convertible seat of the present disclosure. For example, the fittings 34a, 34b may be equipped with slotted holes that allow for translational movement. In other embodiments, the fittings 34a, 34b may include a removable retention pin in place of each of the notches 38a, 38b. Here, the removable retention pins may be received through holes in the fittings 34a, 34b and the legs 15a, 15b of the support structure 14. The retention pin can be removed when the user desires to pivot the seat 10 to a different configuration and may be inserted back into the fittings 34a, 34b to lock the seat 10 in the desired position. In still further embodiments, the fittings 34a, 34b may incorporate a ball and catch design. In this embodiment, the fittings 34a, 34b may be rectangular in shape having an indentation to receive a ball bearing located on each of the legs 15a, 15b of the support structure 14. The user may simply push the ball bearing into the indentation to release the fittings 34a, 34b such that the convertible seat 10 can freely pivot in an upward or downward direction depending on the desired configuration. In yet further embodiments, the convertible seat 10 may include a pivoting brace or a hinge mechanism for locking the seat 10 in place while it is oriented in the vertical configuration.

In use, when the hang-on tree stand 100 is secured to a tree, the standing platform 12 is generally parallel to the ground, and the support structure 14 is oriented in a generally vertical position. The primary seating surface 24 of the convertible seat 10 may be placed in a horizontal or standard seating configuration to provide a conventional sitting position for the user. The user may then desire to move the convertible seat 10 to an elevated seating configuration. In this embodiment, the convertible seat 10 may be pivoted in an upwardly direction to the vertical or elevated seating configuration. The upward pivot movement occurs until the notches 38a, 38b catch the stop members 40a, 40b. At this point, the convertible seat 10 is in the fully vertical configuration. When in the fully vertical configuration, the secondary seating surface 26 is now in a generally horizontal position while the primary seating surface 24 is in a generally vertical position. The user may either sit on the secondary seating surface 26 in this position, so that most of the user's weight is supported by the secondary seating surface 26, or the user may simply lean on the secondary seating surface 26.

In some embodiments, the hang-on tree stand 100 and the convertible seat 10 attached thereto may be collapsible. In the collapsible embodiment, the support structure 14 folds down so that it is parallel with the standing platform 12. The convertible seat 10 may also fold into a position that is generally parallel with the standing platform 12. Advantageously, the hang-on tree stand 100 may be transported and stored in the collapsed position and may be moved into the operational position for use in a tree.

The seating surface 22 may be formed of any suitable material that is durable yet comfortable for the user. For instance, the seating surface 22 may be formed of mesh, canvas, neoprene, velour, leather, denim, or fabric. In some embodiments, the seating surface 22 is formed of a mesh material. The material of the seating surface 22 may optionally be painted with a camouflage pattern to aid in concealing the convertible seat 10. The seat frame 20 may be formed of any resilient material that can withstand the weight of the user. In one embodiment, the seat frame 20 is formed of aluminum. Aluminum is light enough to be transported into a wooded area by the user. In other embodiments, the seat frame 20 may be formed of high strength steel. In still further embodiments, the seat frame 20 may be formed of a resilient, synthetic plastic material, such as a reinforced glass fiber or other high strength material.

Figure 6:
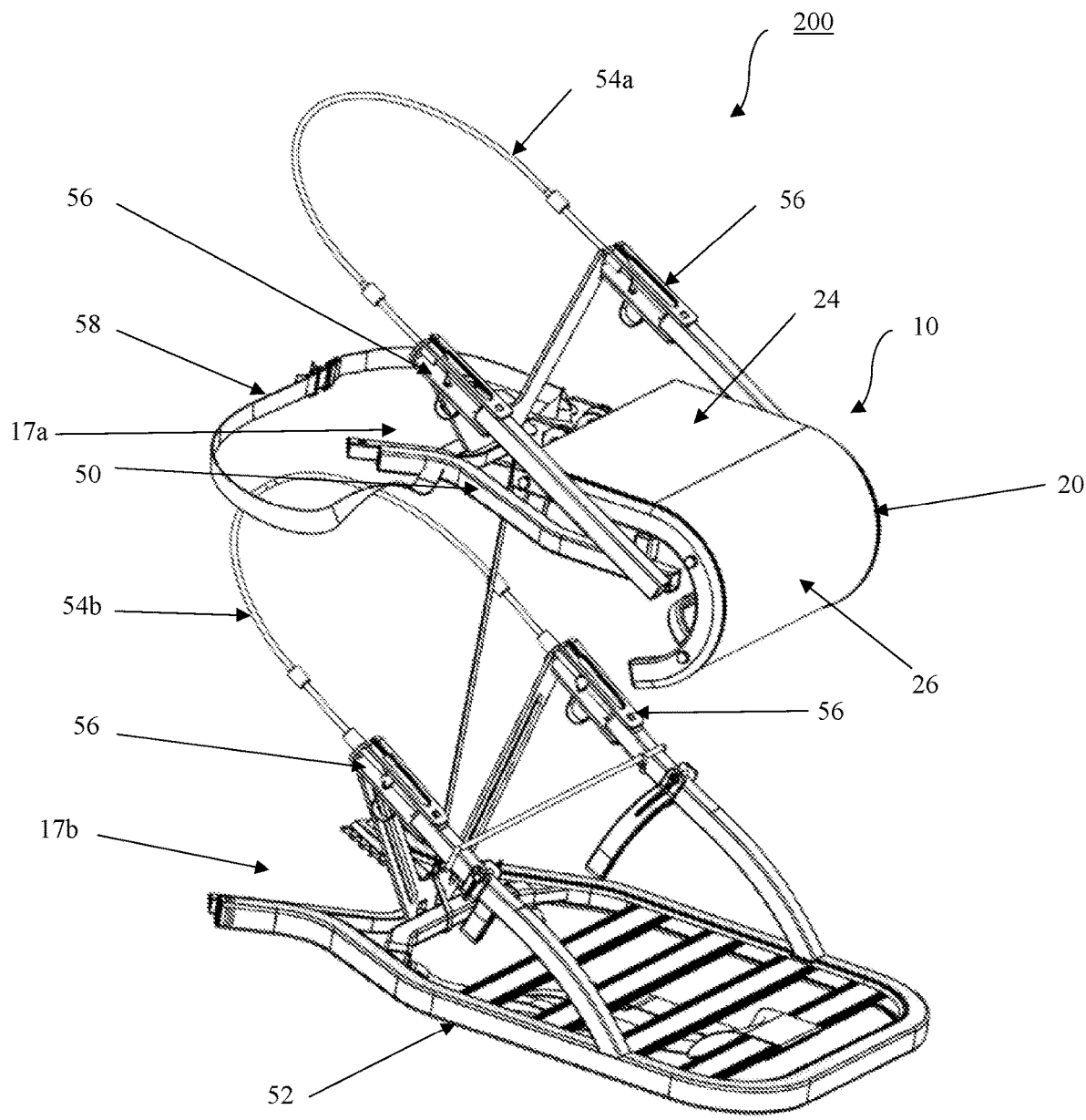
FIG. 6 is a perspective view of a climbing tree stand having the convertible seat attached thereto in the horizontal or standard seating configuration according to one embodiment of the present disclosure.
Figure 7A:
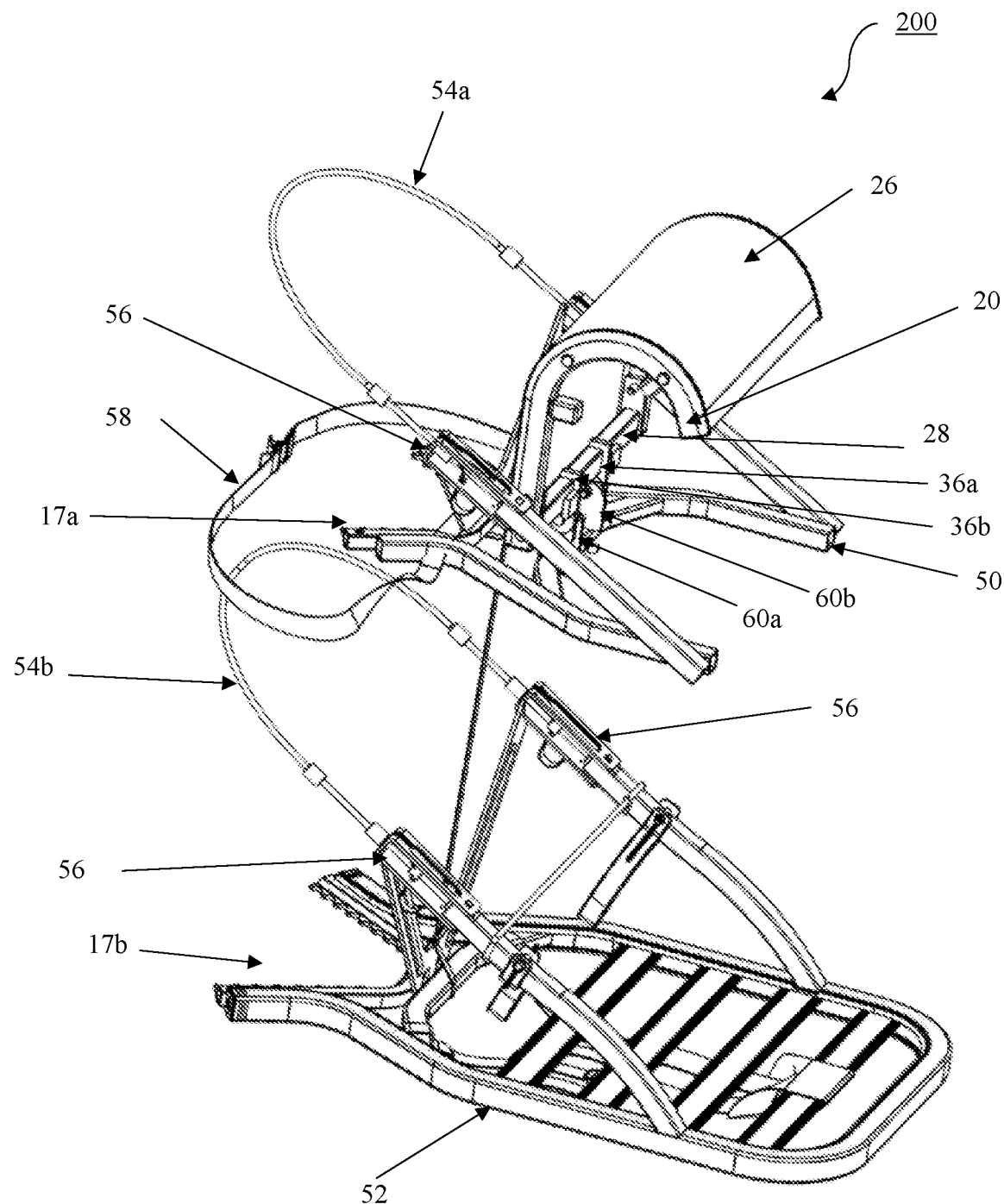
FIG. 7A is a perspective view of the climbing tree stand having the convertible seat attached thereto in the vertical or elevated seating configuration according to one embodiment of the present disclosure.
Figure 7B:
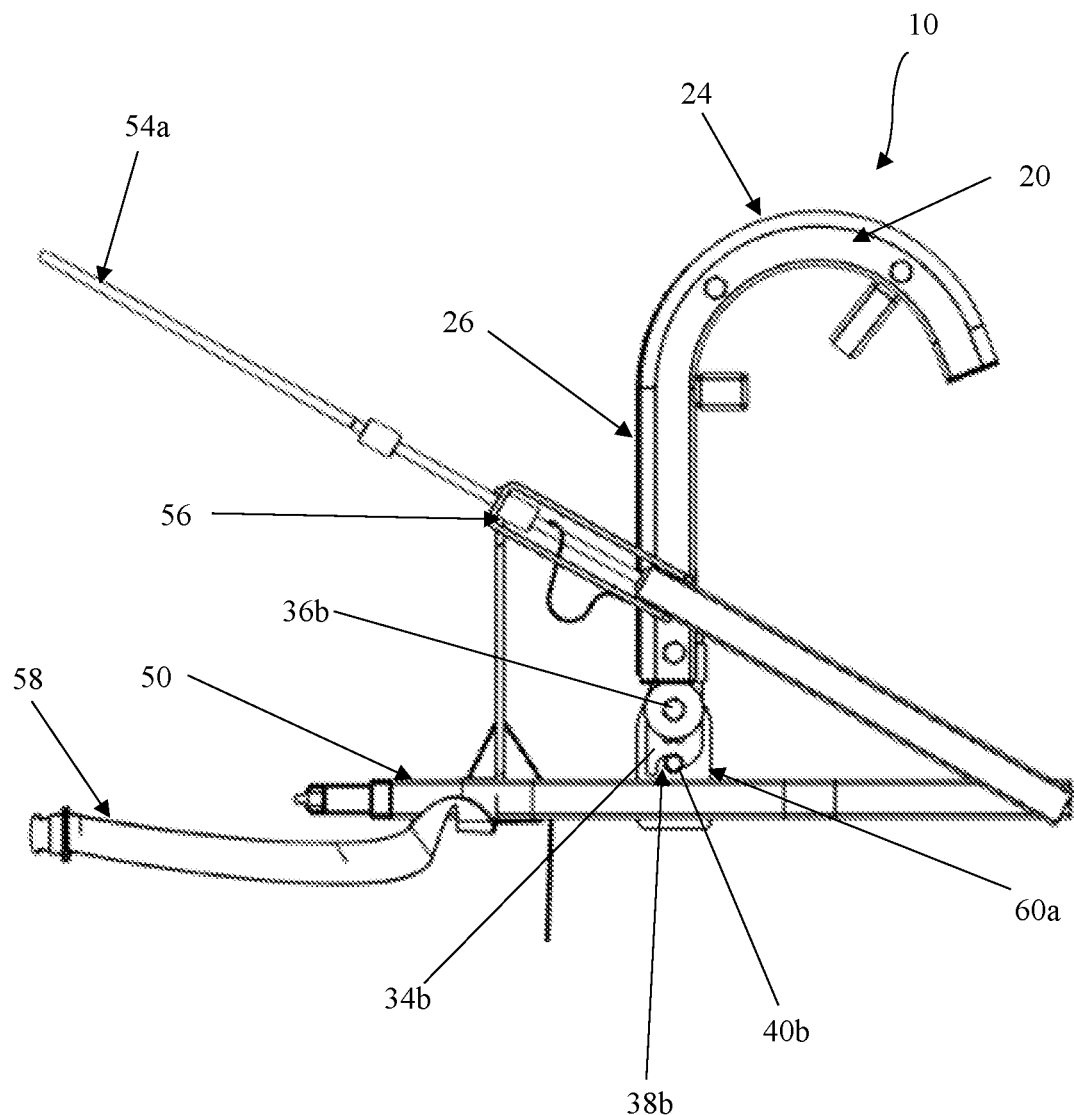
FIG. 7B is a side view of a top portion of the climbing tree stand shown in FIG. 7A.

FIGS. 6, 7A, and 7B show the convertible seat 10 of the present disclosure attached to a climbing tree stand 200. The climbing tree stand 200 is intended to move up and down the tree. The climbing tree stand 200 has an upper platform 50 positioned above a lower platform 52. The convertible seat 10 is operatively attached to the upper platform 50 such that the user's feet can be supported by the lower platform 52 when the user is seated on or leaning against the convertible seat 10. Each of the upper and lower platforms 50, 52 have cables 54a, 54b, respectively, attached thereto. The cables 54a, 54b are dimensioned to be wrapped around a tree. The climbing tree stand 200 may also include a securing strap 58 that can be wrapped around the tree for additional support. The upper and lower platforms 50, 52 attach to the tree in the same fashion as the hang-on tree stand described above having the blades 17a, 17b that dig into the tree or engage the tree while a central portion of each of the cables 54a, 54b encircles and holds the upper and lower platforms 50, 52 to the tree.

The upper and lower platforms 50, 52 may each include an adjustment mechanism 56 attached thereto for receiving the ends of the cables 54a, 54b. The adjustment mechanism 56 is configured for adjusting the overall length of the cables 54a, 54b to accommodate varying tree diameters. The spacing between the nuts on the cables 54a, 54b provides a good adjustment increment to accommodate different size trees. An exemplary adjustment mechanism is shown and described in U.S. Pat. No. 5,975,242.

The convertible seat 10 as described above with respect to FIGS. 1-4 may be used with the climbing tree stand 200. In this embodiment, however, the underside of the rear edge 28 of the seat frame 20 is attached to the upper platform 50. As shown in FIGS. 7A and 7B, the rear edge 28 of the seat frame 20 is attached to two vertical posts 60a, 60b positioned in the middle of the upper platform 50. The rear edge 28 is operatively attached to each vertical post 60a, 60b via the fittings 34a, 34b disclosed above. The fittings 34a, 34b are attached to the vertical posts 60a, 60b via the fasteners 36a, 36b received through corresponding holes in the fittings 34a, 34b and the vertical posts 60a, 60b.

The convertible seat 10 attached to the climbing tree stand 200 can operate in a similar fashion as described above with respect to the hang-on tree stand 100. When the climbing tree stand 200 is secured to a tree, both the upper platform 50 and the lower platform 52 are generally parallel to the ground. The primary seating surface 24 of the convertible seat 10 may be placed in a horizontal or standard seating configuration to provide a conventional sitting position for the user, as illustrated in FIG. 6. In this embodiment, the user's feet may be placed on the lower platform 52. The user may then desire to move the convertible seat 10 to an elevated seating configuration. In this embodiment, the convertible seat 10 may be pivoted in an upwardly direction to the vertical or elevated seating configuration, as illustrated in FIG. 7. The exemplary locking mechanisms described above, for instance, the stop members 40a, 40b and the brace members 46a, 46b positioned on the seat, may be used with the convertible seat 10 on the climbing tree stand 200 to secure the convertible seat 10 in either the horizontal or vertical configuration (as depicted in FIGS. 6, 7A, and 7B).

While not illustrated in the figures, the convertible seat 10 can also be utilized with ladder stands. Ladder stands are stationary and utilize a ladder to climb up into the stand. Ladder stands contemplated by the present invention are similar to the hang-on tree stands described above, but with a ladder structurally integrated into the design. The ladder may be attached to the front of the foot platform to give the user access to the stand. The convertible seat 10 of the present disclosure may be used with any type of ladder stand.

Figure 8:
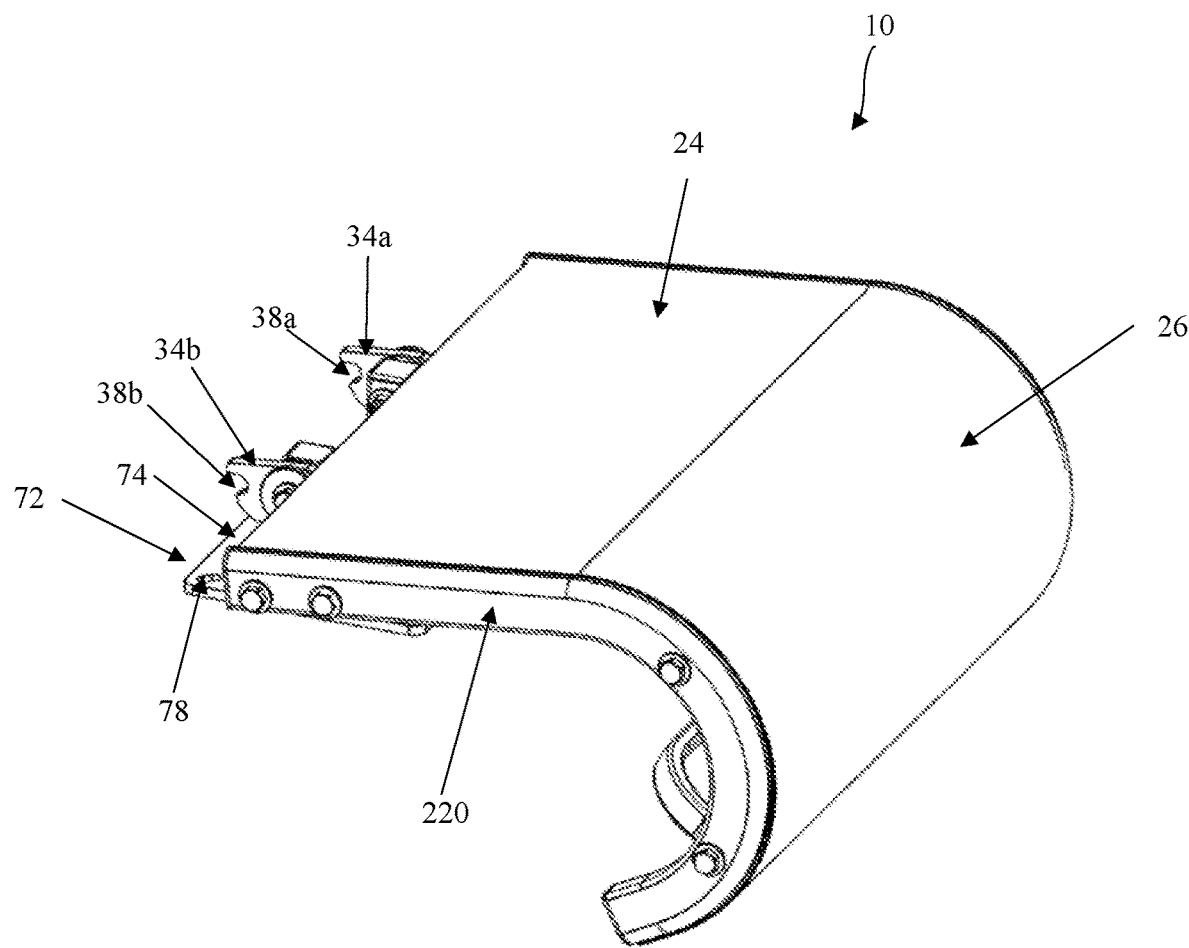
FIG. 8 is a perspective view of the convertible seat in the horizontal or standard seating configuration and adapted for use in a boat according to one embodiment of the present disclosure.
Figure 9:
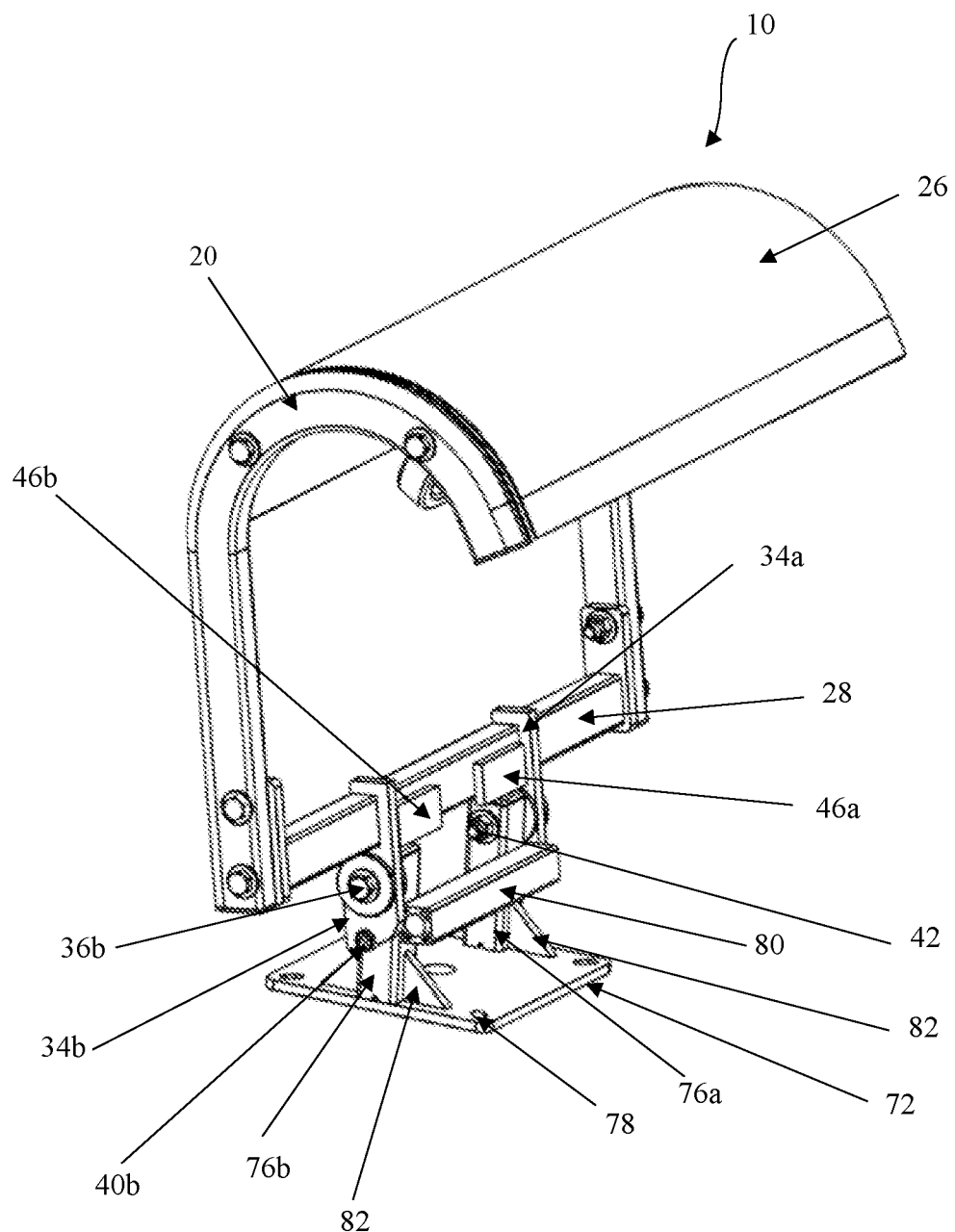
FIG. 9 is a perspective view of the convertible seat in the vertical or elevated seating configuration and adapted for use in a boat according to one embodiment of the present disclosure.

FIGS. 8 and 9 show the convertible seat 10 of the present disclosure configured for use as a boat seat. The convertible seat 10 may be particularly advantageous for boats, such as fishing boats since the convertible seat 10 can convert to an elevated seating/leaning configuration for fisherman when they are casting a line. The fisherman can fish at a more desirable elevated position. In the illustrated embodiment, the convertible seat 10 is operatively attached to a platform 72. The platform 72 may be directly attached to a base (not shown) for supporting a boat seat. The platform 72 has a planar upper surface 74 having two vertical supports 76a, 76b extending therefrom. The vertical supports 76a, 76b may have one or more brace structures 82 extending from the base of each vertical support 76a, 76b. In the illustrated embodiment, both vertical supports 76a, 76b include triangular shaped brace structures 82 on each side of the base of the supports 76a, 76b. Four slots 78 are formed in the platform 72 and are configured to receive fasteners, such as bolts, which can extend downwardly through the slots 78 and are threaded into the base (not shown) in order to secure the convertible seat 10 rigidly in place on top of the base. In some embodiments, the platform 72 should have substantially the same width and length as a plate on the base to which it will be attached.

The convertible seat 10 is attached to the platform 72 using a similar mechanism as described above with respect to FIGS. 1-7. As illustrated in FIG. 9, the underside of the rear edge 28 of the seat frame 20 is attached to the vertical supports 76a, 76b on the platform 72 via the fittings 34a, 34b disclosed above. The fittings 34a, 34b are attached to the vertical supports 76a, 76b using the fasteners 36a, 36b. The fasteners 36a, 36b are received through corresponding holes in the fittings 34a, 34b and the vertical supports 76a, 76b. Horizontal brace 80 extending across the vertical supports 76a, 76b may be used for additional support.

The convertible seat 10 shown in FIGS. 8 and 9 can operate in a similar fashion as discussed above. When the convertible seat 10 is utilized as a boat seat, the primary seating surface 24 of the convertible seat 10 may be placed in a horizontal or standard seating configuration to provide a conventional sitting position for the boater, as illustrated in FIG. 8. In this embodiment, the boater's feet may be positioned on the floor of the boat or other marine vehicle. The user may then desire to move the convertible seat 10 to an elevated seating configuration. In this embodiment, the convertible seat 10 may be pivoted in an upwardly direction to the vertical or elevated seating configuration, as illustrated in FIG. 9. In this embodiment, the boater can sit in an elevated seating position or lean against the convertible seat 10. The exemplary locking mechanisms described above, for instance, the stop members 40a, 40b and the brace members 46a, 46b positioned on the seat, may be used with the convertible seat 10 to secure the convertible seat 10 in either the horizontal or vertical configuration (as depicted in FIGS. 8 and 9, respectively).

Figure 10:
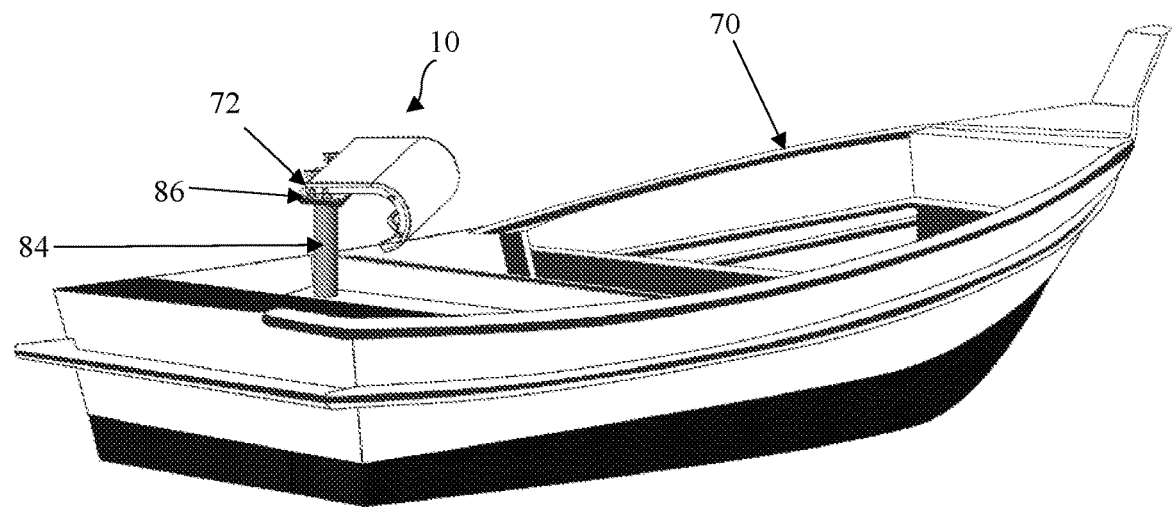
FIG. 10 is a perspective view of the convertible seat in the horizontal or standard seating configuration and attached within a boat according to one embodiment of the present disclosure.
Figure 11:
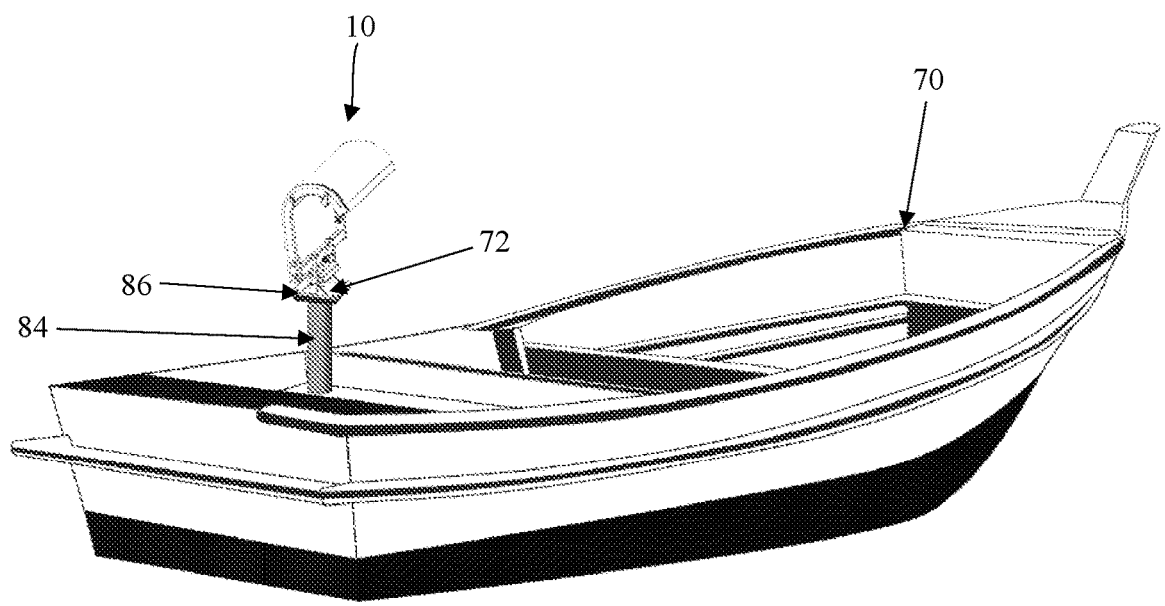
FIG. 11 is a perspective view of the convertible seat in the vertical or elevated seating configuration and attached within a boat according to one embodiment of the present disclosure.

FIGS. 10 and 11 show the convertible seat 10 of the present disclosure attached to a base 84 for supporting the seat 10 within a boat 70. FIG. 10 shows the convertible seat 10 in the horizontal or standard seating configuration while FIG. 11 shows the convertible seat 10 in the vertical or elevated seating configuration. As illustrated in FIGS. 10 and 11, the platform 72 of the seat 10 is operatively attached to the base 84. The base 84 may have a mount 86 to which the platform 72 is attached. In this embodiment, the mount 86 may have slots (not shown) that correspond with the slots 78 on the platform 72 so that fasteners may inserted therethrough to attach the convertible seat 10 to the base 84. The base 84 may be a marine post or pedestal, such as an adjustable pedestal. The mount 86 may be a plate, a swivel seat mount, or a fixed seat mount. While the convertible seat shown in FIGS. 8-11 has been shown for use in a boat, as will be appreciated by those of ordinary skill in the art, the convertible seat having the platform attached thereto may be adapted for use in other types of vehicles, such as construction vehicles (e.g., forklifts, bulldozers, excavators, etc.), agricultural vehicles (e.g., tractors, plows, etc.), and the like.

Figure 12:
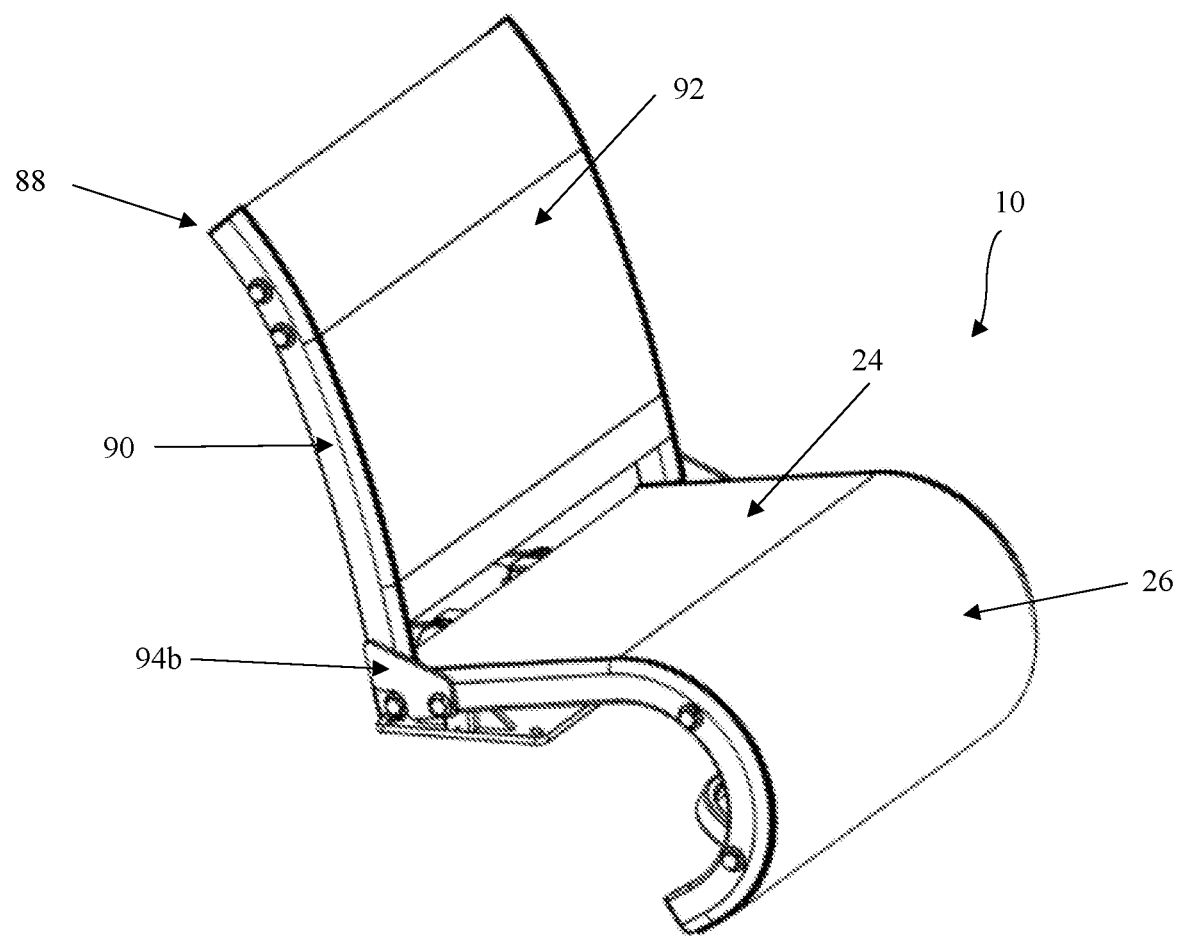
FIG. 12 is a perspective view of the convertible seat in the horizontal or standard seating configuration with a back rest attached thereto according to one embodiment of the present disclosure.
Figure 13:
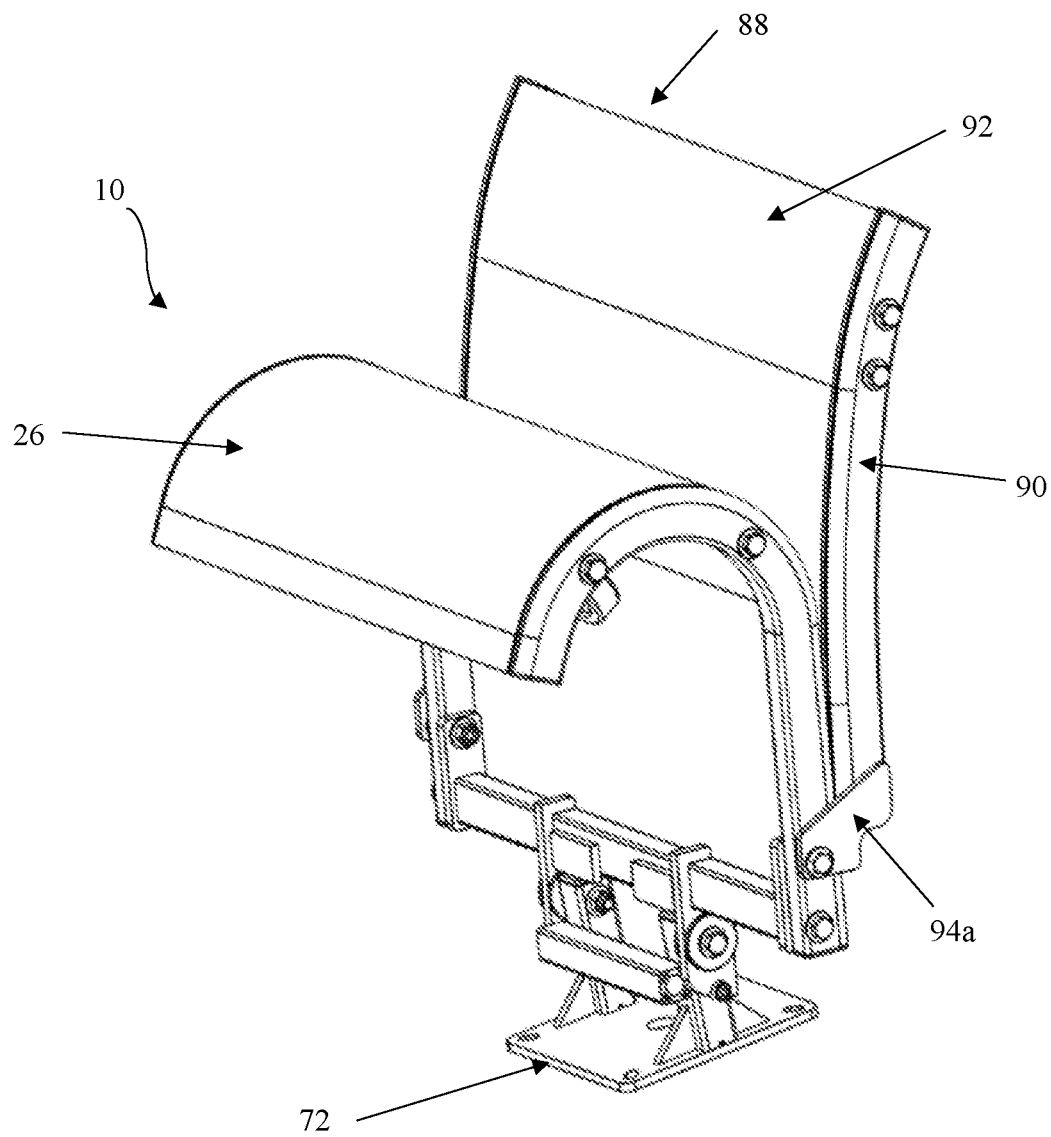
FIG. 13 is a perspective view of the convertible seat in the vertical or elevated seating configuration with a back rest attached thereto according to one embodiment of the present disclosure.

FIGS. 12 and 13 show the convertible seat 10 illustrated in FIGS. 8 and 9, respectively, having a back rest attached thereto. The back rest can add comfortability to the seat for the user. For instance, when used in a boat, the back rest can add comfort and support for the boater, especially when the boat is travelling at a high rate of speed. The convertible seat having the back rest attached thereto may also be advantageous for seating in stadiums or theaters. Users can utilize the elevated seating configuration to get a better view of the sporting event, concert, or theatrical event.

As illustrated in FIGS. 12 and 13, the convertible seat 10 may have a back rest 88 attached to the seat frame 20. The back rest 88 has a frame 90 that defines a back rest surface 92 that can be used to support the back of the user. The frame 90 is operatively attached to the seat frame 20 via hinges 94a, 94b. The hinges 94a, 94b may be attached to the seat frame 20 and the frame 90 with fasteners, such as bolts. The hinges 94a, 94b allow the seat 10 to pivot upward and downward relative to the back rest 92 between the standard seating configuration and the elevated seating configuration. While the back rest has been illustrated on the convertible seats shown in FIGS. 8 and 9, one of ordinary sill in the art will appreciate that the back rests described herein may also be utilized on the convertible seats attached to the tree stands described herein.

The foregoing description illustrates and describes the apparatuses and other teachings of the present disclosure. Additionally, the disclosure shows and describes only certain embodiments of the apparatuses and other teachings disclosed, but, as mentioned above, it is to be understood that the teachings of the present disclosure are capable of use in various other combinations, modifications, and environments and are capable of changes or modifications within the scope of the teachings as expressed herein, commensurate with the skill and/or knowledge of a person having ordinary skill in the relevant art. The embodiments described hereinabove are further intended to explain certain best modes known of practicing the apparatuses and other teachings of the present disclosure and to enable others skilled in the art to utilize the teachings of the present disclosure in such, or other, embodiments and with the various modifications required by the particular applications or uses. Accordingly, the apparatuses and other teachings of the present disclosure are not intended to limit the exact embodiments and examples disclosed herein. Any section headings herein are provided only for consistency with the suggestions of 37 C.F.R. § 1.77 or otherwise to provide organizational queues. These headings shall not limit or characterize the invention(s) set forth herein.

What is claimed is:

1. A tree stand, comprising:
a standing surface;
a support structure having an upper end and a lower end, wherein the lower end is operatively connected to the standing surface;
a convertible seat operatively attached to the upper end of the support structure, wherein the convertible seat comprises a primary seating surface integrally formed with a secondary seating surface, the primary seating surface extending from a rear portion to a frontmost portion of the convertible seat and the secondary seating surface extending from the frontmost portion of the primary seating surface to a bottom edge of the convertible seat,
wherein the convertible seat is operable to move about a horizontal axis between a standard seating configuration in which the primary seating surface is parallel with the standing surface and the secondary seating surface is perpendicular to the primary seating surface and an elevated seating configuration in which the secondary seating surface is parallel with the standing surface and the primary seating surface is perpendicular to the secondary seating surface,
wherein, when in the standard seating configuration, the secondary seating surface curves downwardly from the frontmost portion of the primary seating surface to the bottom edge of the secondary seating surface and inwardly toward the support structure such that the bottom edge of the secondary seating surface is vertically aligned with the frontmost portion of the primary seating surface,
wherein the standard seating configuration supports a user in a first position at a first height and the elevated seating configuration supports the user in a second position at a second height, the second height being higher than the first height, and
wherein the convertible seat is formed of aluminum.

2. The tree stand of claim 1, wherein the primary seating surface is flat.

3. The tree stand of claim 1, wherein the second height is at least 10 inches higher than the first height.

4. The tree stand of claim 1, wherein, when the convertible seat is oriented in the standard seating configuration, the convertible seat is operable to pivot in an upward direction about the horizontal axis to convert the convertible seat to the elevated seating configuration.

5. The tree stand of claim 1, wherein, when the convertible seat is oriented in the elevated seating configuration, the convertible seat is operable to pivot in a downward direction about the horizontal axis to convert the convertible seat to the standard seating configuration.

6. The tree stand of claim 1, wherein the bottom edge is horizontally aligned with the frontmost portion of the primary seating surface when the convertible seat is in the elevated seating configuration.

7. A tree stand, comprising:
a standing surface;
a support structure having an upper end and a lower end, wherein the lower end is operatively connected to the standing surface;
a convertible seat pivotally attached to the upper end of the support structure, wherein the convertible seat comprises a first seating surface integrally formed with a second seating surface,
wherein the convertible seat is operable to pivot between a standard seating configuration that supports a user in a first position at a first height and an elevated seating configuration that supports the user in a second position at a second height, the second height being higher than the first height, and
wherein, when the convertible seat is in the standard seating configuration, the first seating surface is flat and parallel to the standing surface and the second seating surface curves downwardly from the first seating surface and inwardly toward the support structure such that a bottom edge of the second seating surface is vertically aligned with a frontmost portion of the first seating surface.

8. The tree stand of claim 7, wherein the bottom edge of the second seating surface is horizontally aligned with the frontmost portion of the first seating surface when the convertible seat is in the elevated seating configuration.

9. The tree stand of claim 7, wherein, when the convertible seat is oriented in the standard seating configuration, the convertible seat is operable to pivot in an upward direction about the horizontal axis to convert the convertible seat to the elevated seating configuration.

10. The tree stand of claim 7, wherein, when the convertible seat is oriented in the elevated seating configuration, the convertible seat is operable to pivot in a downward direction about the horizontal axis to convert the convertible seat to the standard seating configuration.

11. The tree stand of claim 7, further comprising a support cable attached to the support structure and the standing surface.

\* \* \* \* \*